United States Patent [19]

Guglielmino

[11] Patent Number: 4,584,641
[45] Date of Patent: Apr. 22, 1986

[54] COPYPROTECTING SYSTEM FOR SOFTWARE PROTECTION

[76] Inventor: Paul Guglielmino, 734 Marble Way, Boca Raton, Fla. 33432

[21] Appl. No.: 533,132

[22] Filed: Aug. 29, 1983

[51] Int. Cl.[4] .................................................. G06F 1/00
[52] U.S. Cl. ...................................... 364/200; 364/300; 360/60
[58] Field of Search ... 364/200 MS File, 900 MS File, 364/300; 360/60

[56] References Cited

U.S. PATENT DOCUMENTS 4,086,634  4/1978  Cook ...................................... 360/60

*Primary Examiner*—Raulfe B. Zache
*Attorney, Agent, or Firm*—Malin, Haley & McHale

[57] ABSTRACT

A means for copyprotecting disks. The present invention may be utilized with both blank and programmed disks. Permanent random input/output errors such as an absence of magnetic material are placed on a disk by removal of material or by other methods and an input/output error trap routine or program is placed on the disk. The input/output error trap routine or program runs during the use of the user software program. A copied disk will not contain the permanent input/output error that existed on the original target disk because the input/output errors are not reproduced because they are not machine readable. When the copied disk is run, the input/output error trap routine cannot locate the permanent input/output error that existed on the original target disk. When the permanent input/output error is not located by the input/output error trap routine the volume table of contents on the disk is scrambled, the input/output error trap routine is deleted and the copied or pirated user software program is scrambled both in memory and on the disk. Location of the permanent input/output error by the input/output error trap routine on the target disk allows the user software program to continue normal processing.

20 Claims, 4 Drawing Figures

COPYPROTECTING SYSTEM FOR SOFTWARE PROTECTION

BACKGROUND OF THE INVENTION

This invention relates to the duplication of computer software program materials which are susceptible to unauthorized duplication or copying using the medium of floppy or hard disks.

Copying computer software is illegal but prosecution is extremely difficult. The initial development of computer programs is costly and time consuming resulting in a fee of several hundred dollars for programs. A blank floppy diskette costs under $5.00 and a program may be copied onto the blank diskette within a few minutes. Copy protection has existed by incorporating periodic unused sector or track on the disk and by placing part of the program out of sequence in a number of tracks. This system of placing the program in a random order confuses the computer and brings the copying to a halt. The problem with the existing copy protection program is that software programs have been developed to allow the user's computer to unscramble the copy protecting program to allow it to be copied.

The present invention provides a copyprotecting system that allows a floppy or hard disk to be reproduced but when the unauthorized disk is run the copied software program will delete intself from the floppy disk and makes the disk unusable.

SUMMARY OF THE INVENTION

The present invention relates to a means for copy protecting software programs. The rampant copying of software programs is crippling the development of new software programs by preventing the originator of the software program to recoup research and development costs of developing a software program. The present invention relates to a means for copyprotecting a user software program by providing a target disk with permanent input/output errors and an input/output error trap module in conjunction with the user software program. Although the target disk may be readily copied, the copied or pirated disk will be rendered useless upon running the copied or pirated disk.

It is an object of this invention to prevent the unauthorized copying of software programs. t is a further object of this invention to provide a method for preparing original disks to prevent the running of copied or pirated disks.

In accordance with these and other objects which will be apparent hereinafter, the instant invention will now be described with particular reference to the accompanying drawings.

DESCRIPTION OF THE PREFERRED EMBODIMENT

Figure 3A:
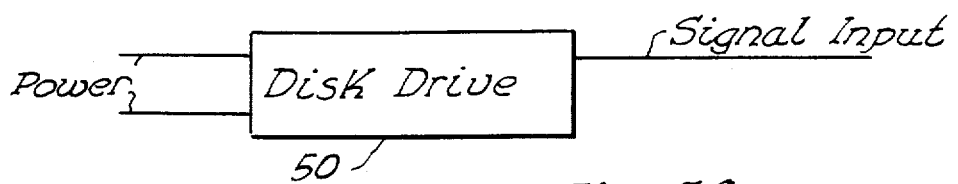
FIG. 3A is a block diagram of a disk drive with computer input shown.
Figure 3B:
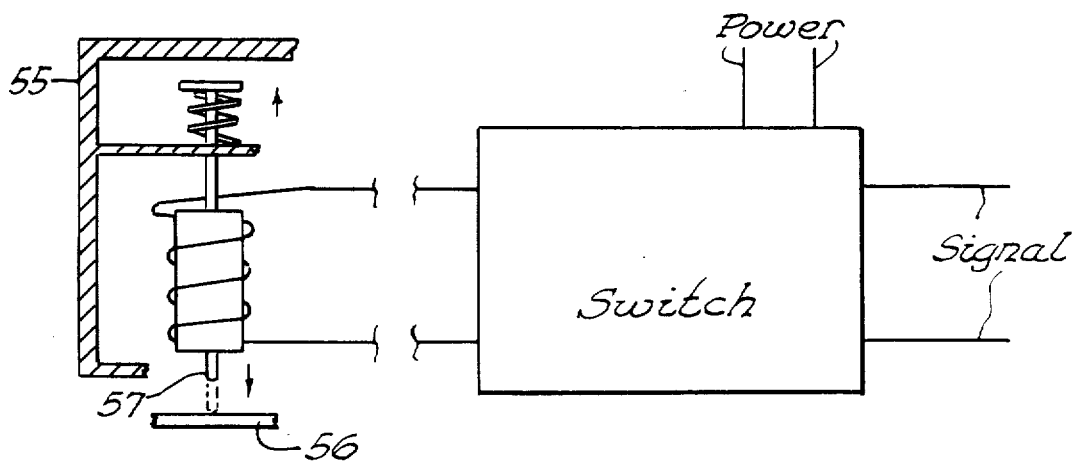
FIG. 3B is a diagram of the disk error maker.

The copy protecting system may be used on both initialized floppy or hard disks and uninitialized floppy or hard disks. The term disk refers to a floppy disk or a hard disk or diskette and is not restricted to any size. This allows the copy protecting system to be used on blank floppy or hard disks and also to be incorporated on floppy or hard disks that have an existing software program on them. The copy protecting system provides a target disk. The target disk may include a disk that has an existing software program or a software program may be added to the target disk. The target disk may be prepared by placing a permanent input/output error on either a blank disk or a disk with an existing software program. The permanent input/output error may be placed on the target disk by physically removing the iron oxide from the target disk thus rendering that location useless for storing magnetically encoded information. The location of the track and sector on the target may be determined by a software program through use of a disk drive 50 as shown in FIG. 3A. A conventional disk drive such as an Apple Disk II may be utilized. The unused track and sector are located. The permanent input/output error may be imprinted on the target disk manually or by a disk arm 55 as shown in FIG. 3B that is attached to a disk drive, 50 and is under the direction of a program to locate a particular track and sector location. The target disk, 56, is permanently marked (marred) by physically removing the magnetic medium use as but not limited to iron oxide from the target disk 56, by using a head, 57. The head, 57, may include a means for physically placing a scratch or hole on the target disk, 56. The process of locating an unused track and sector and removing the iron oxide from the target disk may be repeated to provide a plurality of permanent input/output errors. The permanently marked track and sector location may be referred to as a permanent input/output error. The permanent input/output error may be accomplished by physically marking the target disk with a scratch, punched hole or other means of making a permanent mark on the target disk. The permanent input/output error may include a plurality of permanent input/output errors identifiable by track and sector locations.

The permanent input/output errors have been placed on either an uninitialized or initialized target disk. The volume table of contents (VTOC) of said target disk may be programmed to indicate that the location of the permanent I/O error(s) is no longer available for program storage or data storage. Each target disk may include at least one permanent input/output error. A plurality of permanent input/output errors may be randomly placed on a target disk and the VTOC updated to include each permanent input/output error. The random permanent input/output error serve as a fingerprint for each target disk. The tracks and sectors where permanent input/output errors are located are no longer available for storage of program or data information.

Once the VTOC is programmed to reflect the location of each input/output error, a permanent input/output error trap program is placed on the disk.

Figure 1:
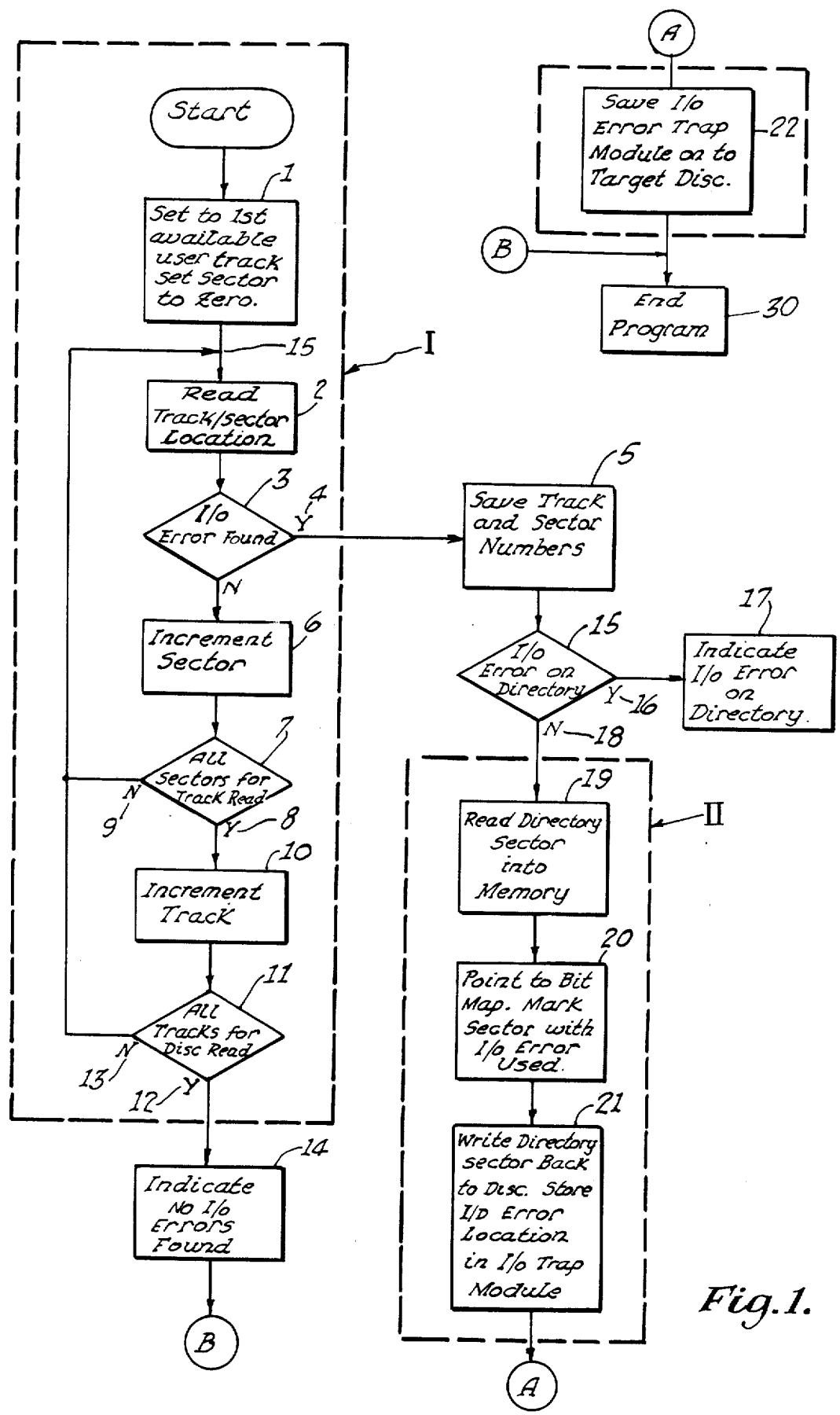
FIG. 1 is a flow chart demonstrating the creation of the non-copyable target disk.

FIG. 1 shows a flow chart of how the copy-protected target disk is created. The segment I, identified by the dash lined (— — —) box, refers to the process of locating the track and sector where the permanent input/output error are positioned on the target disk. A software program identifies the first available user track and the sector track is set to zero, 1. The software program reads the track and sector location, 2. The software program looks for a permanent input/output error, 3, at the track and sector location, 2. If an input/output error is found as indicated by Y, 4, the software program proceeds to save the track and sector numbers, 5. If a permanent input/output error is not found as indicated by N, 4, the software program proceeds to increment the sector, 6. After the sector is incremented, 6, the software program reads all sectors for the track location, 7. If the track is located, as indicated by Y, 8, the software program proceeds to increment the track, 10. If the track is not located, as indicated by n, 9, the software program proceeds to position 15 before the read track and sector command 2. The software program may repeat the sequence from N, 9, to position 15, through read all sectors for track 7, until a Y, 8 is indicated. When all sectors for track are read, 8, the track is incremented, 10. The software program then reads all tracks for disk, 13. If all tracks are read, as indicated by Y, 12, no permanent input/output error is found on the target disk, 14. [and a target disk may not be created.] If all tracks are not read, as indicated by N, 13, the software program returns to position 15, and proceeds to read the track and sector location. Once all tracks for disk are read, as indicated by Y, 12, and the software program indicated no permanent input/output error is located the software program proceeds to the end of the program, 30.

If a permanent input/output error is located, 3, as indicated by Y, 4, the software program proceeds to save the track number, 5, and to save the sector number, 5. Once the track-number and sector number have been saved, 5, the software program checks the directory of the disk, 15, to determine if the track number and sector number are located on the directory. If the track number and sector number are located on the directory, as indicated by Y, 16, the software program indicates that the permanent input/output error is on the directory, 17. If the permanent input/output error is not located on the directory of the disk as indicated by N, 18, the software program proceeds with the steps in segment II, identified by the dash lined (————) box. The software program [reads the sector location into the directory memory, 19.] The software program [points to the bit map of the track which contains the permanent input/output error and marks the sector with the permanent input/output error used, 20.] The software program then unites the directory sector back to the target disk and stores the permanent input/output error location in the input/output error trap program, 21. Once the target disk has been created, the user software package is modified to execute the input/output error trap module. The modified user software package is placed on the target disk. The software program then saves the updated input/output error trap module on the target disk, 22, which has been placed on the target disk.

Figure 2:
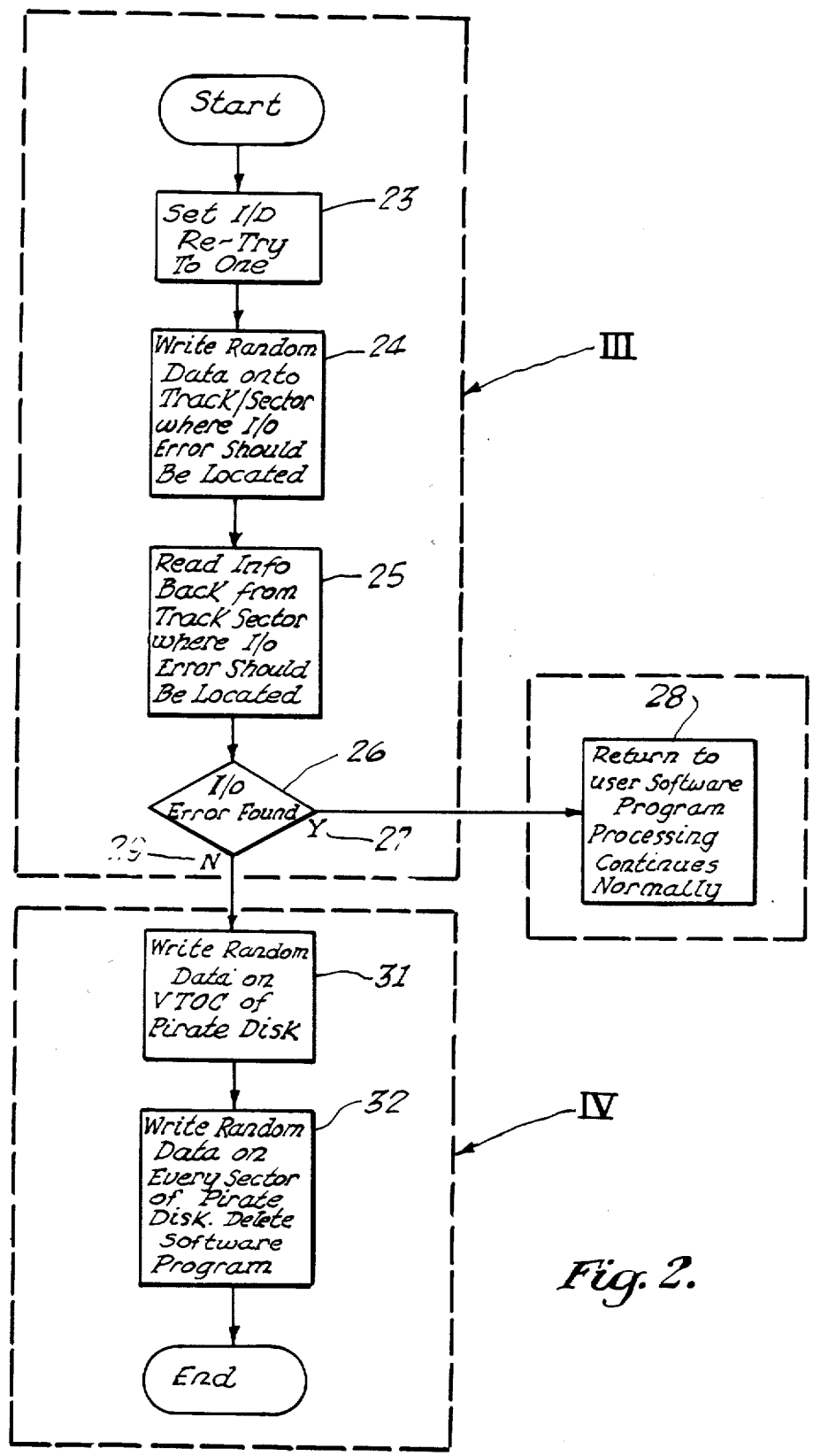
FIG. 2 is a flow chart demonstrating the execution of the input/output error trap routine.

The input/output error trap program may be integrated into the software package. An existing software package may be modified to execute the input/output error trap program. Once the target disk contains the user software package and the input/output error trap program module, the input/output error trap may be executed as shown in FIG. 2. Segment III, identified by the dash lined (————) box, refers to the execution of the input/output error routine of the input/output error trap module. The software program sets the input/output error [re-try to one, 23]. [The software program locates the track number and sector number of the permanent input/output error location of the disk]. The input/output error trap routine writes some information onto the track and sector locations where the permanent input/output error is located, 24, according to the disk directory. The software program then reads the information, 25, that was written onto the track and sector location identified as containing a permanent input/output error. If the software program locates the permanent input/output error, 25, as indicted by Y, 27, the software program returns to the user software program, 28, and normal processing continues, 28. If a permanent input/output error, 26, is not found, as indicated by N, 29, the software program proceeds to segment IV, identified by the dash lined (————) box. If the software program's ability to write information on the track and sector location identified as a permanent input/output error location, 24, indicates that the software program is no longer on the target disk but instead on a copied or pirated disk, the input/output error trap program deletes the user software package from the computer memory, writes random data which overlays the volume table of contents (VTOC) of the copied or pirated disk, 31, writes random data on every sector of the copied or pirated disk, 32, which destroys any information on the disk and deletes the input/output error trap program from the disk, 32. The program also is deleted from the computer memory.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A target disk that is not copyable, comprising:
magnetic material;
at least one input/output error means untransferable for copying purposes by machine readable computers;
a physical magnetic readable signal;
said physical magnetic readable signal inducing a signal means for allowing bypassing said input/output error means to allow continuous use of said target disk but to prevent use of a copied disk.

2. A target disk as set forth in claim 1, wherein:
said input/output error is permanent.

3. A target disk as set forth in claim 2, wherein:
said magnetic material including magnetic medium;
said input/output error may be provided by physically removing a portion of said magnetic medium from said target disk.

4. A target disk as set forth in claim 2, wherein:
said target disk includes sectors and a target disk loaded with an existing software program;
one of said sectors of said target disk including at least one unused sector;
said unused sector located to allow placing at least one said permanent input/output error on said target disk;
modifying said existing software program to integrate said input/output error means.

5. A copyprotecting method as set forth in claim 2, wherein:
said target disk includes sectors and a target disk loaded with an existing software program;
one of said sectors of said target disk including at least one unused sector;
said unused sector located to allow placing at least one said permanent input/output error on said target disk;

modifying said existing software program to integrate said input/output error.

6. A target disk as set forth in claim 2, wherein: said input/output error is a permanent physical error.

7. A copyprotecting method for preventing the pirating of computer software programs, comprising:
   placing at least one permanent input/output error on the target disk in a random pattern;
   updating said permanent input/output error on the Volume Table of Contents of said disk;
   loading an error software program on said target disk;
   updating said error software program to acknowledge said permanent input/output error;
   such that said error software program deletes the copied program on the reproduced disk based on the absence of said permanent input/output error on the reproduced disk.

8. A method as set forth in claim 7 wherein said target disk being copied onto a disk searching by said input/output error trap software program missing said permanent input/output error;
   instructing said Volume Table of Contents to be scrambled;
   instructing said input/output error software program to be deleted;
   instructing said existing software program to be scrambled.

9. A method for copyprotecting a computer software program on a disk to prevent pirating of computer software programs comprising the following steps:
   placing at least one permanent input/output error on at least one sector of a target disk;
   updating the volume table of contents of said target disk to indicate said sector with said permanent input/output error;
   loading the input/output error trap software program on said target disk;
   updating said input/output error trap software program to read said sector with said permanent input/output error;
   searching by said input/output error trap software program for said permanent input/output error during the use of said target disk;
   encountering said permanent input/output error;
   continuing with normal processing of user software programs.

10. A method for copyprotecting user software programs comprising: a target disk;
    said target disk including at least one input/output error means;
    a software means so constructed and arranged to locate said input/output error means on said target disk;
    such that a copied disk would not include said input/output error means;
    said copied disk would be rendered useless upon running of said copied disk;
    said input/output error means cannot be stored or read and therefore is not machine readable and thereby not transferable for copying purposes;
    said software means includes means to bypass the located input/output error means to allow continuous use of the target disk but to prevent further use of a copied disk.

11. A target member that is not copyable, comprising:
    magnetic material;
    at least one input/output error means untransferable for copying purposes by machine readable computers;
    a physical magnetic readable signal;
    said physical magnetic readable signal inducing a signal means for allowing bypassing said input/output error means to allow continuous use of said target member but to prevent use of a copied member.

12. A target member as set forth in claim 11, wherein: said input/output error is permanent.

13. A target member as set forth in claim 12, wherein:
    said magnetic material including magnetic medium;
    said input/output error may be provided by physically removing a portion of said magnetic medium from said target member.

14. A target member as set forth in claim 12, wherein:
    said target member includes sectors and a target member loaded with an existing software program;
    one of said sectors of said target member including at least one unused sector;
    said unused sector located to allow placing at least one said permanent input/output error on said target member;
    modifying said existing software program to integrate said input/output error means.

15. A copyprotecting method as set forth in claim 12, wherein:
    said target member includes sectors and a target member loaded with an existing software program;
    one of said sectors of said target member including at least one unused sector;
    said unused sector located to allow placing at least one said permanent input/output error on said target member;
    modifying said existing software program to integrate said input/output error.

16. A target member as set forth in claim 12, wherein: said input/output error is a permanent physical error.

17. A copyprotecting method for preventing the pirating of computer software programs, comprising:
    placing at least one permanent input/output error on the target member in a random pattern;
    updating said permanent input/output error on the Volume Table of Contents of said target member;
    loading an error software program on said target member;
    updating said error software program to acknowledge said permanent input/output error;
    such that said error software program deletes the copied program on the reproduced member based on the absence of said permanent input/output error on the reproduced member.

18. A method as set forth in claim 17, wherein said target member being copied onto a member searching by said input/output error trap software program missing said permanent input/output error;
    instructing said Volume Table of Contents to be scrambled;
    instructing said input/output error software program to be deleted;
    instructing said existing software program to be scrambled.

19. A method for copyprotecting a computer software program on a member to prevent pirating of computer software program comprising the following steps:
    placing at least one permanent input/output error on at least one sector of a target member;

updating the volume table of contents of said target member to indicate said sector with said permanent input/output error;

loading the input/output error trap software program on said target member;

updating said input/output error trap software program to read said sector with said permanent input/output error;

searching by said input/output error trap software program for said permanent input/output error during the use of said target member;

encountering said permanent input/output error;

continuing with normal processing of user software programs.

20. A method for copyprotecting user software programs comprising:

a target member;

said target member including at least one input/output error means;

a software means so constructed and arranged to locate said input/output error means on said target member;

such that a copied member would not include said input/output error means;

said copied member would be rendered useless upon running of said copied member;

said input/output error means cannot be stored or read and therefore is not machine readable and thereby not transferable for copying purposes;

said software means includes means to bypass the located input/output error means to allow continuous use of the target member but to prevent further use of a copied member.

* * * * *